United States Patent
Hamashima et al.

(10) Patent No.: US 11,485,687 B2
(45) Date of Patent: Nov. 1, 2022

(54) CERAMIC COATING FILM-PROVIDED MEMBER AND GLASS ARTICLE MANUFACTURING APPARATUS USING IT

(71) Applicant: AGC Inc., Chiyoda-ku (JP)

(72) Inventors: Kazuo Hamashima, Chiyoda-ku (JP); Mizuki Matsuoka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 1032 days.

(21) Appl. No.: 16/180,430

(22) Filed: Nov. 5, 2018

(65) Prior Publication Data

US 2019/0071361 A1    Mar. 7, 2019

Related U.S. Application Data

(63) Continuation of application No. PCT/JP2017/021021, filed on Jun. 6, 2017.

(30) Foreign Application Priority Data

Jun. 17, 2016 (JP) .............................. JP2016-120896

(51) Int. Cl.
*C04B 35/622* (2006.01)
*C03B 5/43* (2006.01)
(Continued)

(52) U.S. Cl.
CPC ...... *C04B 35/62222* (2013.01); *C03B 5/1672* (2013.01); *C03B 5/43* (2013.01);
(Continued)

(58) Field of Classification Search
CPC .............. C04B 35/62222; C04B 35/10; C04B 2235/3217; C04B 2235/3208; C03B 5/1672; C03B 5/43; Y10T 428/31504
(Continued)

(56) References Cited

U.S. PATENT DOCUMENTS

| 3,422,880 | A | * | 1/1969 | Brown .................... B22C 1/165 |
| | | | | 164/517 |
| 2010/0242542 | A1 | | 9/2010 | Hessenkemper |
| 2015/0352630 | A1 | * | 12/2015 | Bewlay .................... B22C 3/00 |
| | | | | 164/349 |

FOREIGN PATENT DOCUMENTS

| JP | 10-287479 | 10/1998 |
| JP | 2005-193455 | 7/2005 |
| WO | WO 2012/133107 A1 | 10/2012 |

OTHER PUBLICATIONS

International Search Report dated Jul. 4, 2017 in PCT/JP2017/021021, filed on Jun. 6, 2017 (with English Translation).
(Continued)

*Primary Examiner* — Humera N. Sheikh
*Assistant Examiner* — Katherine A Christy
(74) *Attorney, Agent, or Firm* — Oblon, McClelland, Maier & Neustadt, L.L.P.

(57) ABSTRACT

To form, on a ceramic member or a metal member, a thermal spray ceramic coating film which achieves both the quality of a ceramic coating film and gas barrier property, and with which a composite oxide having a melting point lower than the ambient temperature will not form when used as a coating film on a ceramic member or a metal member constituting a glass article manufacturing apparatus.
A ceramic coating film-provided member comprising a ceramic member or a metal member and a thermal spray ceramic coating film formed on at least a part of the surface of the ceramic member or the metal member,
wherein the thermal spray ceramic coating film contains $Al_2O_3$ and $12CaO \cdot 7Al_2O_3$, and the weight ratio of CaO to $Al_2O_3$ ($CaO/Al_2O_3$) is more than 0.11 to 0.50.

14 Claims, 5 Drawing Sheets

(51) Int. Cl.
| | |
|---|---|
| *C04B 35/10* | (2006.01) |
| *C04B 41/87* | (2006.01) |
| *C23C 4/134* | (2016.01) |
| *C23C 4/10* | (2016.01) |
| *C03B 5/167* | (2006.01) |
| *C23C 4/129* | (2016.01) |
| *C23C 4/11* | (2016.01) |
| *C04B 41/00* | (2006.01) |
| *C04B 41/50* | (2006.01) |
| *C04B 111/76* | (2006.01) |

(52) U.S. Cl.
CPC ............ *C04B 35/10* (2013.01); *C04B 41/009* (2013.01); *C04B 41/0054* (2013.01); *C04B 41/5031* (2013.01); *C04B 41/87* (2013.01); *C23C 4/10* (2013.01); *C23C 4/11* (2016.01); *C23C 4/129* (2016.01); *C23C 4/134* (2016.01); *C04B 2111/76* (2013.01); *C04B 2235/3208* (2013.01); *C04B 2235/3217* (2013.01); *C04B 2235/9669* (2013.01); *C04B 2237/30* (2013.01); *Y10T 428/31504* (2015.04)

(58) Field of Classification Search
USPC .......................................................... 428/469
See application file for complete search history.

(56) References Cited

OTHER PUBLICATIONS

Teraushi, T. "Refractories for Glass Production", New Glass, vol. 28, No. 8, 2013, p. 39-45.

Ohmori, A., et al. "Current Status of Thermal Spray Technology", Journal of the Surface Finishing Society of Japan, vol. 59, No. 8, 2008, p. 484-489.

* cited by examiner

CERAMIC COATING FILM-PROVIDED MEMBER AND GLASS ARTICLE MANUFACTURING APPARATUS USING IT

TECHNICAL FIELD

The present invention relates to a ceramic coating film-provided member having a thermal spray ceramic coating film formed on the surface of a ceramic member or a metal member, and a glass article manufacturing apparatus using it.

BACKGROUND ART

In a glass article manufacturing apparatus by float process, for a portion to be in direct contact with molten glass, electrocast brick which is less likely to be corroded or some very dense sintered brick is used as an apparatus material (Non-Patent Document 1). On the other hand, for a portion not to be in direct contact with molten glass but to be influenced by volatile components or a corrosive gas formed from the molten glass and thus required to have mechanical properties at high temperature for a long period of time, sintered brick composed mainly of alumina and silica, such as sillimanite brick, is used as a ceramic member (Patent Document 1). Further, for such a portion, a steel material including stainless steel or a metal material having heat resistance of molybdenum may sometimes be used as a metal member.

The above ceramic member or metal member is used depending upon the resistance to volatile components or a corrosive gas formed from molten glass and the heat resistance required for the application site.

Formation of a ceramic coating film as a functional film for the purpose of gas barrier property, etc., on the surface of such a ceramic member or a metal member used in the glass article manufacturing apparatus, has been studied.

As a ceramic coating film formed for the above purpose, an alumina coating film containing alumina ($Al_2O_3$) as the main component and a zirconia coating film containing zirconia ($ZrO_2$) as the main component have been widely used practically (Non-Patent Document 2). As an alumina coating film, a gray alumina coating film having titania added to white alumina may sometimes be used for the purpose of improving fracture toughness. Further, as a zirconia coating film, a stabilized zirconia coating film having yttria, magnesia, calcia or the like added may sometimes be used for the purpose of preventing phase transition at high temperature.

For formation of such a ceramic coating film, thermal spray coating method is commonly employed, which is capable of forming a thick coating film as compared with CVD, PVD, etc., which can achieve formation of a coating film remarkably quickly, and which is easily adapted to members with various sizes and shapes (Non-Patent Document 2).

However, in the alumina coating film or the zirconia coating film formed by thermal spray coating method, due to very high melting point of raw material, a large amount of pores remain, and the gas barrier property is insufficient in some cases.

In order to improve the gas barrier property, introduction of a metal foundation coat or formation of a composite material with a metal, so-called formation of a cermet, has been conducted. However, by such a method, the use conditions are limited by the properties of a metal to be a foundation coat used or a metal to be formed into a composite material, whereby the quality of the obtainable ceramic coating film, such as a high heat resistance temperature and corrosion resistance to various corrosive gases tends to be impaired.

Further, in a case where the glass composition to be produced in a production apparatus contains an alkali component such as Na or K, $Na_2O$, $K_2O$ or the like volatilizes in a high temperature environment in which molten glass is produced from glass raw material, and as a result, in a case where a metal foundation coat is employed, in a case where a metal used for formation of a composite material is present, or in a case where $SiO_2$ or $Cr_2O_3$ is contained in the ceramic coating film, a composite oxide having a melting point lower than the ambient temperature is formed at the surface of the ceramic coating film. By falling of such a composite oxide, glass products to be produced may be contaminated.

$Na_2O$ or $K_2O$ volatilized from molten glass will react with a chromium oxide coating film which is an oxidation resistant passive coating film of stainless steel if used as a metal member, whereby exhaustion of the stainless steel may be accelerated.

PRIOR ART DOCUMENTS

Patent Documents

Patent Document 1: U.S. Pub. No. US2010/0242542

Non-Patent Documents

Non-Patent Document 1: Tadao Teraushi, NEW GLASS, Vol. 28, No. 8, p. 39-44, 2013

Non-Patent Document 2: Akira Ohmori, Akira Nakahira, Journal of the Surface Finishing Society of Japan, Vol. 59, No. 8, p. 484-489, 2008

DISCLOSURE OF INVENTION

Technical Problem

In order to solve the above-described problems of prior art, it is an object of the present invention to form the following thermal spray ceramic coating film on a ceramic member or a metal member. That is, when the thermal spray ceramic coating film is used, in a glass article manufacturing apparatus, etc., as a coating film on a ceramic member or a metal member to be used for a portion not to be in direct contact with molten glass but to be influenced by volatile components or a corrosive gas formed from molten glass and thus required to have mechanical properties at high temperature for a long period of time, densification of the thermal spray ceramic coating film and homogenization of the composition of the thermal spray ceramic coating film proceed, whereby a composite oxide having a melting point lower than the ambient temperature will not form, and whereby both quality of a ceramic coating film and gas barrier property can be achieved.

Solution to Problem

In order to achieve the above object, the present inventors have conducted extensive studies and as a result, they have found the following. That is, when aluminum oxide and calcium oxide are reacted in a predetermined proportion, a composite oxide having a melting point at a level of 1,300° C. which is equal to those of practical metals can be obtained, and by combining the composite oxide with high melting point ceramic particles, a dense ceramic coating film excellent in gas barrier property can be formed. The present inventors have also found that when such a ceramic coating film is used, in a glass article manufacturing apparatus, etc., as a coating film of a ceramic member or a metal member to be used for a portion not to be in direct contact with molten glass but to be influenced by volatile components or a corrosive gas formed from molten glass and thereby required to have mechanical properties at high temperature for a long period of time, a composite oxide having a melting point lower than the ambient temperature will not form.

The present invention has been accomplished on the basis of the above discoveries and provides, a ceramic coating film-provided member comprising a ceramic member or a metal member and a thermal spray ceramic coating film formed on at least a part of the surface of the ceramic member or the metal member, wherein the thermal spray ceramic coating film contains $Al_2O_3$ and $12CaO.7Al_2O_3$, and the weight ratio of CaO to $Al_2O_3$ ($CaO/Al_2O_3$) is more than 0.11 to 0.50.

The present invention further provides a glass article manufacturing apparatus using the above ceramic coating film-provided member of the present invention.

Advantageous Effects of Invention

The ceramic coating film of the ceramic coating film-provided member of the present invention can achieve both quality of a ceramic such as a high heat resistant temperature and corrosion resistance to various corrosive gases, and gas barrier property of a coating film. Accordingly, the ceramic coating film-provided member of the present invention has excellent properties as a ceramic member or a metal member used for a glass article manufacturing apparatus, etc.

Further, when the ceramic coating film-provided member of the present invention is used, in a glass article manufacturing apparatus, etc., for a portion not to be in direct contact with molten glass but to be influenced by volatile components or a corrosive gas formed from molten glass and thereby required to have mechanical properties at high temperature for a long period of time, densification of the thermal spray ceramic coating film and homogenization of the composition of the thermal spray ceramic coating film proceed, whereby a composite oxide having a melting point lower than the ambient temperature will not form, and as a result, contamination of an obtainable glass product with a composite oxide can be prevented.

DESCRIPTION OF EMBODIMENTS

Figure 1:
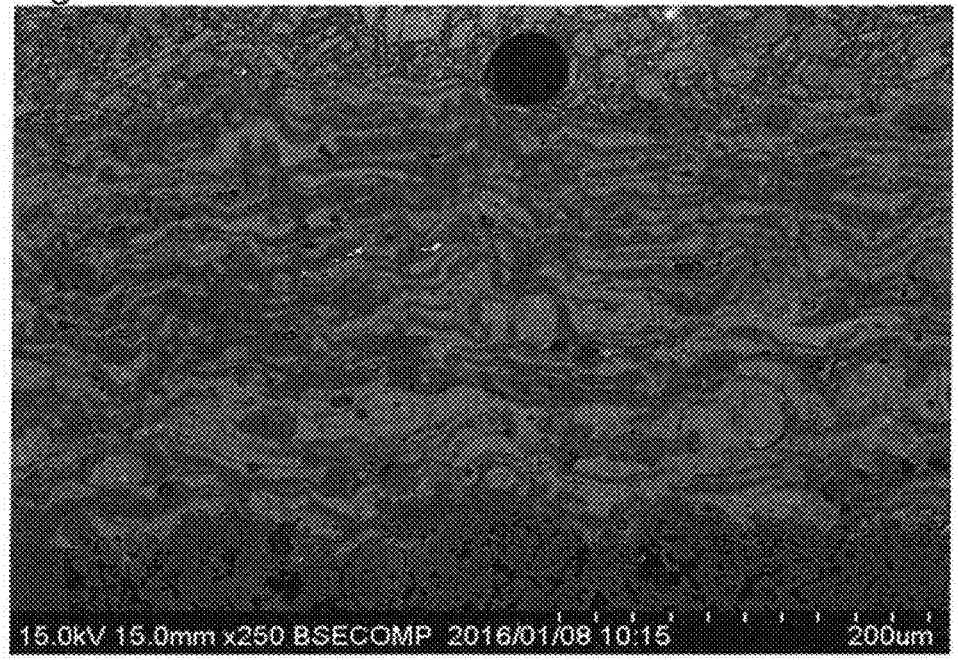
FIG. 1 is a micrograph of a cross section of a thermal spray ceramic coating film immediately after formed on a ceramic member (sillimanite brick).

The coating film-provided member of the present invention is one having a thermal spray ceramic coating film formed on at least a part of the surface of a ceramic member or a metal member.

The ceramic member may be a ceramic member to be used in a glass article manufacturing apparatus by float process. Specifically, it may be sintered brick composed mainly of alumina and silica, such as sillimanite brick, to be used, in a glass article manufacturing apparatus by float process, etc., for a portion usually not to be in direct contact with molten glass but to be influenced by volatile components or a corrosive gas formed from molten glass and thereby required to have mechanical properties at high temperature for a long period of time.

The metal member may be a metal member to be used in a glass article manufacturing apparatus e.g. by float process, etc. Specifically, it may be a metal material having heat resistance, such as a steel material including stainless steel or a molybdenum material, to be used in a glass article manufacturing apparatus by float process, for a portion usually not to be in direct contact with molten glass but to be influenced by volatile components or a corrosive gas formed from molten glass and thereby required to have mechanical properties at high temperature for a long period of time.

The steel material may, for example, be preferably stainless steel, chromium molybdenum steel, heat resisting steel or hot work tool steel, and is more preferably austenite stainless steel or hot work tool steel.

Further, the molybdenum material is preferably pure molybdenum, ceramic dispersion strengthened molybdenum alloy or molybdenum tungsten alloy, and is more preferably pure molybdenum in view of processability and economic efficiency.

The thermal spray ceramic coating film is formed as a functional film on the surface of the ceramic member or the metal member. The thermal spray ceramic coating film is formed, for example, on a ceramic member to be used, in a glass article manufacturing apparatus by float process, etc., for a portion usually not to be in direct contact with molten glass but to be influenced by volatile components or a corrosive gas formed from molten glass and thereby required to have mechanical properties at high temperature over a long period of time, for the purpose of improving corrosion resistance of a surface to be directly exposed to volatile components or a corrosive gas from molten glass.

Further, the thermal spray ceramic coating film is formed, for example, for the purpose of preventing oxidation of a metal member to be used, in a glass article manufacturing apparatus by float process, for a portion not to be in direct contact with molten glass but to be influenced by volatile components or a corrosive gas formed from molten glass and thereby required to have mechanical properties at high temperature over a long period of time.

Accordingly, the thermal spray ceramic coating film should be formed on a portion on which formation of a functional film is required of the surface of the ceramic member or the surface of the metal member, and it may not be formed on the entire surface of the ceramic member or the metal member. For example, in the case of the ceramic member, the thermal spray ceramic coating film may be formed only on the surface on a side to be directly exposed to volatile components or a corrosive gas from molten glass, or, the thermal spray ceramic coating film may be formed only on a portion to be directly exposed to volatile components or a corrosive gas from molten glass when used in a glass article manufacturing apparatus, of the surface on a side to be directly exposed to volatile components or a corrosive gas from molten glass. In the case of the metal member, the thermal spray ceramic coating film may be formed only on a portion exposed to the atmosphere.

Of the coating film-provided member of the present invention, the thermal spray ceramic coating film is formed by using feedstock for thermal spray coating containing $Al_2O_3$ and $12CaO.7Al_2O_3$.

Of the feedstock for thermal spray coating, $Al_2O_3$ (alumina) is a fundamental material of the thermal spray ceramic coating film and is commercially available as a feedstock for thermal spray coating. Specifically, white alumina having $Al_2O_3$ purity of at least 99.0%, for example, Metco 6103 manufactured by Oerlikon Metco may be used. As $Al_2O_3$, particles having a particle size range of preferably from approximately 10 to approximately 150 μm, more preferably from approximately 15 to approximately 53 μm may be used.

Of the feedstock for thermal spray coating, $12CaO.7Al_2O_3$ is a binder component of the thermal spray ceramic coating film. $12CaO.7Al_2O_3$ is a composite oxide having a melting point of about 1,380° C. and is a typical composition of a mayenite compound.

By blending as the binder component $12CaO.7Al_2O_3$ having a melting point of preferably from 1,300 to 1,500° C., more preferably from 1,350 to 1,450° C., with the above high melting point fundamental material alumina, preferably white alumina, a dense thermal spray ceramic coating film having very few pores and having high gas barrier property can be formed. Further, the bonding strength of particles will improve, whereby the strength of the thermal spray ceramic coating film will improve. Further, the thermal spray coating operation will be easy, whereby a wide variety of apparatus and application sites will be possible.

Further, in a case where the thermal spray ceramic coating film is used as a coating film on the ceramic member or the metal member to be used, in a glass article manufacturing apparatus by float process, etc., for a portion not to be in direct contact with molten glass but to be influenced by volatile components or a corrosive gas formed from molten glass and thereby required to have mechanical properties at high temperature over a long period of time, densification of the ceramic coating film and homogenization of the composition of the ceramic coating film will proceed by heat history at the time of use, and an effect of improving properties of the ceramic coating film can be expected.

For the feedstock for thermal spray coating, $Al_2O_3$ and $12CaO.7Al_2O_3$ are blended so that the weight ratio of CaO to $Al_2O_3$ ($CaO/Al_2O_3$) will be more than 0.11 to 0.50, whereby a thermal spray ceramic coating film having a Vickers hardness equal to or higher than that of an existing alumina coating film can be formed. The $CaO/Al_2O_3$ (weight ratio) of the thermal spray coating film formed will be the same composition ratio of the feedstock for thermal spray coating.

If the weight ratio ($CaO/Al_2O_3$) is lower than the above range, solubility of the material will be deteriorated at the time of thermal spray coating, and pores in the thermal spray ceramic coating film will increase, and if it is higher than the above range, the Vickers hardness of the resulting thermal spray ceramic coating film will remarkably decrease. The weight ratio ($CaO/Al_2O_3$) in the feedstock for thermal spray coating and in the thermal spray coating film is preferably from 0.15 to 0.40, more preferably from 0.20 to 0.40, further preferably from 0.25 to 0.35.

The feedstock for thermal spray coating may be obtained by mixing a $12CaO.7Al_2O_3$ powder and an $Al_2O_3$ powder each having a particle size suitable for thermal spray coating with the above blend ratio. The particle size of the $12CaO.7Al_2O_3$ powder is within a range of preferably from 10 to 100 μm, more preferably from 15 to 53 μm. Specifically, a $12CaO.7Al_2O_3$ powder and an $Al_2O_3$ powder each having the above particle size are mixed in a solvent and granulated e.g. by a spray drying method, followed by calcination and classification to prepare a powder.

For formation of the thermal spray ceramic coating film, the same technique as for formation of an existing alumina coating film may be employed. Specifically, known plasma thermal spray coating or high velocity oxy-fuel thermal spray coating disclosed in e.g. Thermal Spray Technology Handbook (Japan Thermal Spray Society, 2010) may be employed. Particularly, plasma thermal spray coating is preferred, whereby feedstock powders can be sufficiently dissolved, and a denser thermal spray ceramic coating film can be formed. Plasma thermal spray coating is preferred also in view of easiness of formation of a thick film and adaptability to on-site application.

Thermal spray coating conditions at the time of forming the thermal spray ceramic coating film are not particularly limited, and known conditions may be applied and suitably selected depending upon the thermal spray coating method applied. In the case of plasma thermal spray coating, the thermal spray coating conditions may be the same as standard conditions with respect to commercial white alumina material, whereby a thermal spray ceramic coating film can be formed.

The thickness of the thermal spray ceramic coating film formed on the ceramic member or the metal member is not particularly limited, and in order to meet the requirements as the functional film, the average thickness is preferably at least 80 μm. In the case of the thermal spray ceramic coating film formed on the ceramic member, the average thickness is more preferably at least 100 μm, further preferably at least 120 μm, still more preferably at least 150 μm. On the other hand, in the case of the thermal spray ceramic coating film formed on the metal member, the average thickness is preferably at least 80 μm, more preferably at least 100 μm.

The upper limit of the thickness of the thermal spray ceramic coating film formed on the ceramic member or the metal member is not particularly limited, and in the case of the thermal spray ceramic coating film formed on the ceramic member, since the residual stress at the time of forming the thermal spray ceramic coating film tends to be large and cracks are likely to form, the average thickness is preferably at most 5 mm, more preferably at most 3 mm, further preferably at most 2 mm. In the case of the thermal spray ceramic coating film formed on the metal member, since a thick coating film is likely to be peeled due to a thermal expansion difference, the average thickness is preferably at most 1 mm, more preferably at most 0.5 mm, further preferably at most 0.3 mm.

EXAMPLES

Now, the present invention will be described in further detail with reference to Examples. However, it should be understood that the present invention is by no means restricted thereto.

Example 1

A thermal spray ceramic coating film is formed on the surface of a ceramic member as follows. As the ceramic member, sillimanite brick (manufactured by YOTAI REFRACTORIES CO., LTD.), CACIL-A, size: 100 mm×100 mm×25 mm) was used. On a region (100 mm×100 mm) on one surface of the sillimanite brick, a thermal spray ceramic coating film was formed.

As a feedstock for thermal spray coating, a mixture having $12CaO.7Al_2O_3$ (a powder having calcium aluminate KR-3, tradename, manufactured by MITSUKI SANGYO CO., LTD. pulverized to a particle size of from 15 to 80 μm, the same applies hereinafter) in an amount such that $CaO/Al_2O_3$ (weight ratio) would be 0.25, blended with white alumina (SURPREX AHP50, tradename, manufactured by Fujimi Incorporated, particle size: 10 to 45 μm, the same applies hereinafter), was used. Using this feedstock for thermal spray coating, atmospheric plasma spraying was conducted under the following conditions to form a thermal spray ceramic coating film having an average thickness of 250 μm. The thermal spray coating film has the same $CaO/Al_2O_3$ (weight ratio) as that of the feedstock for thermal spray coating.

Plasma Thermal Spray Coating Conditions:

The ceramic member was preliminarily heated to 300° C., argon and hydrogen gas were applied as the plasma gas, the thermal spray coating distance was 90 mm, and the nozzle moving rate was 300 mm/sec.

Of the above-formed ceramic coating film, the Vickers hardness Hv (kg/mm$^2$) and the average coefficient of linear thermal expansion α ($\times 10^{-6}$/° C.) at from 100 to 800° C. were measured as follows.

The Vickers hardness Hv was measured in such a manner that the prepared thermal spray coating sample was cut and polished, and with respect to the cross section of the thermal spray coating film polished, the hardness was measured on 5 points under a load of 3N by using a micro Vickers hardness tester, and the average value was taken as the measured value. The average coefficient of linear thermal expansion α ($\times 10^{-6}$/° C.) was obtained by increasing the temperature at a rate of 500° C./hr in the air by using a Vertical push tester, followed by measurement within a range of from 100° C. to 800° C. to obtain the average coefficient of linear thermal expansion.

The ceramic member after formation of the thermal spray ceramic coating film was treated with heat in the air at 1,200° C. for 50 hours, and the weight reduction ratio between before and after the heat treatment was measured, whereupon the weight reduction ratio was 0.05%. The ceramic member after the heat treatment was observed, whereupon no fracture or peeling was observed on the ceramic coating film.

The cross section in a thickness direction of the thermal spray ceramic coating film immediately after formed on the ceramic member and the cross section of the thermal spray ceramic coating film after a heat treatment in the air at 1,200° C. for 12 hours, were taken by a scanning electron microscope (SEM, manufactured by Hitachi High-Technologies Corporation, model name: SU1510, magnification: 250, the same applied hereinafter).

FIG. 1 is a micrograph of the cross section of the thermal spray ceramic coating film formed on the ceramic member immediately after formation. In FIG. 1, the lower portion corresponds to the ceramic member. It is observed in FIG. 1 that the formed thermal spray ceramic coating film had few pores, and the adhesion at the interface was favorable. Further, in FIG. 1, white portions correspond to $12CaO.7Al_2O_3$, and black portions correspond to white alumina. In the thermal spray ceramic coating film, they formed a lamellar structure.

Figure 2:
FIG. 2 is a micrograph of a cross section of the thermal spray ceramic coating film in FIG. 1 after subjected to a heat treatment in the air at 1,200° C. for 12 hours.

FIG. 2 is a micrograph of the cross section of the thermal spray ceramic coating film shown in FIG. 1 after a heat treatment in the air at 1,200° C. for 12 hours. It is found from FIG. 2 that by the heat treatment, densification of the thermal spray ceramic coating film proceeded, and the composition became homogenized.

When the coating film-provided member of the present invention is used as a ceramic member constituting a glass article manufacturing apparatus, by thermal history at the time of use, densification of the thermal spray ceramic coating film and homogenization of the composition proceed as shown in FIG. 2, and the properties of the ceramic coating film and the gas barrier property of the coating film will improve.

Then, by using a feedstock for thermal spray coating having $12CaO.7Al_2O_3$ in an amount such that $CaO/Al_2O_3$ (weight ratio) would be 0.11 blended with white alumina, a thermal spray ceramic coating film having an average thickness of 250 μm was formed on a ceramic member in the same manner as above.

Further, by using four types of feedstock for thermal spray coating having $12CaO.7Al_2O_3$ in amounts such that $CaO/Al_2O_3$ (weight ratio) would be 0.25, 0.35, 0.75 and 1.50 blended with white alumina, a thermal spray ceramic coating film having an average thickness of 250 μm was formed on a ceramic member in the same manner as above.

The Vickers hardness Hv and the average coefficient of linear thermal expansion α ($\times 10^{-6}$/° C.) at from 100 to 800° C. of the thermal spray ceramic coating films were measured in the same manner as above. Further, each ceramic member after formation of the thermal spray ceramic coating film was subjected to a heat treatment in the air at 1,200° C. for 50 hours, and the weight reduction ratio between before and after the heat treatment (the ratio of the weight reduction by the heat treatment relative to the weight before the heat treatment) was measured. The results are shown in Table 1 and FIG. 3.

TABLE 1

| $CaO/Al_2O_3$ weight ratio | 0.11 | 0.25 | 0.35 | 0.75 | 1.5 |
|---|---|---|---|---|---|
| Average coefficient of linear thermal expansion α ($\times 10^{-6}$/° C.) | 8.05 | 8.04 | 7.95 | 7.50 | 7.62 |

TABLE 1-continued

| CaO/Al$_2$O$_3$ weight ratio | 0.11 | 0.25 | 0.35 | 0.75 | 1.5 |
|---|---|---|---|---|---|
| Vickers hardness Hv (kg/mm$^2$) | 523 | 839 | 775 | 480 | 286 |
| Weight reduction ratio (%) | 0.06 | 0.05 | 0.04 | 0.17 | 0.25 |

Figure 3:
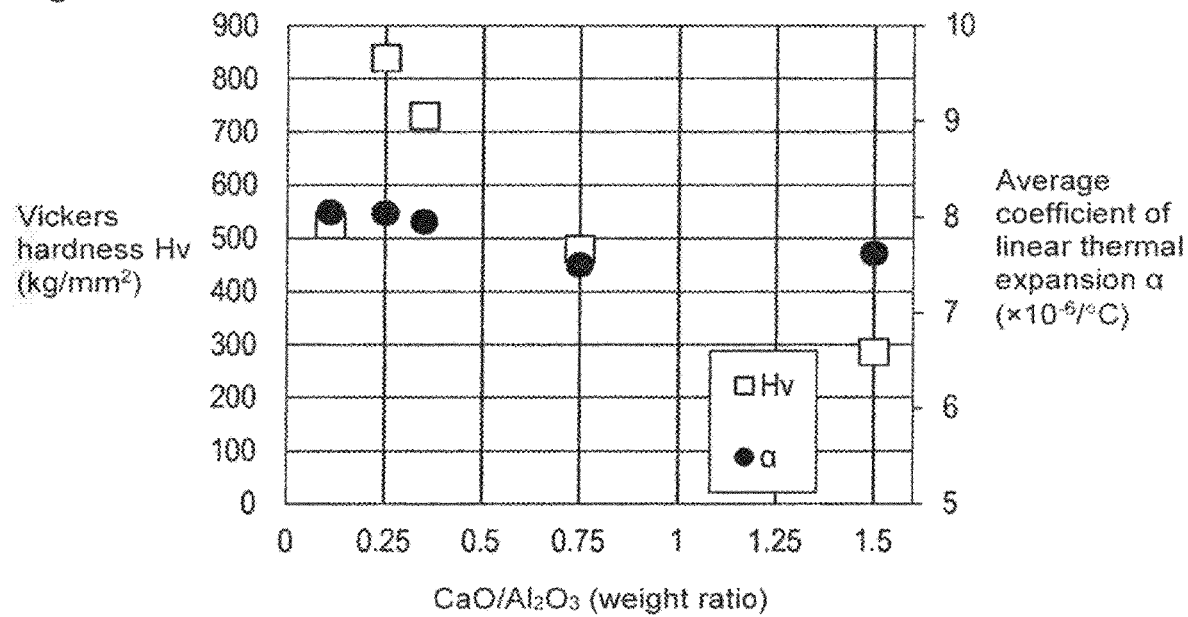
FIG. 3 is a graph illustrating the relation between the $CaO/Al_2O_3$ (weight ratio) in feedstock for thermal spray coating, and the Vickers hardness Hv and the average coefficient of linear thermal expansion $\alpha$ ($\times 10^6/°$ C.) at from 100 to 800° C. of the obtained thermal spray ceramic coating film.

As shown in Table 1 and FIG. 3, by increasing CaO/Al$_2$O$_3$ (weight ratio) in the feedstock for thermal spray coating from 0.11 to 0.25, the Vickers hardness Hv of the thermal spray ceramic coating film remarkably increased. When CaO/Al$_2$O$_3$ (weight ratio) exceeded 0.25, the Vickers hardness Hv of the thermal spray ceramic coating film decreased. The average coefficient of linear thermal expansion α (×10$^{-6}$/° C.) at from 100 to 800° C. gradually decreased as CaO/Al$_2$O$_3$ (weight ratio) increased.

Further, as shown in Table 1, the weight reduction ratio of the thermal spray ceramic coating film between before and after the heat treatment was low when CaO/Al$_2$O$_3$ (weight ratio) in the feedstock for thermal spray coating was 0.11, 0.25 and 0.35, however, when CaO/Al$_2$O$_3$ (weight ratio) in the feedstock for thermal spray coating was 0.75 and 1.50, the weight reduction ratio between before and after the heat treatment remarkably increased.

Then, a ceramic member having a thermal spray ceramic coating film formed by using a feedstock for thermal spray coating having 12CaO.7Al$_2$O$_3$ in an amount such that CaO/Al$_2$O$_3$ (weight ratio) would be 0.25 blended with white alumina, heat cycle resistance was evaluated.

Specifically, the ceramic member after formation of the thermal spray ceramic coating film was placed in an electric furnace, and subjected to 10 cycles each cycle comprising heating the ceramic member at a heating rate of 400° C./hr to 1,300° C., keeping it at 1,300° C. for one hour, cooling it at a cooling rate of 400° C./hr to 500° C., and keeping it at 500° C. for one hour. After completion of 10 cycles, the ceramic member was air-cooled to room temperature, whereupon the thermal spray ceramic coating film formed on the ceramic member was visually observed, and no peeling occurred on the thermal spray ceramic coating film.

Then, a ceramic member having a thermal spray ceramic coating film formed by using a feedstock for thermal spray coating having 12CaO.7Al$_2$O$_3$ in an amount such that CaO/Al$_2$O$_3$ (weight ratio) would be 0.25 blended with white alumina, was subjected to an exposure test to alkali-containing glass as follows.

An alumina crucible in which 15 g of alkali-containing glass (soda lime glass manufactured by Asahi Glass Company, Limited) was set in an alumina tube, and the alumina crucible was lidded with the ceramic member having a thermal spray ceramic coating film formed thereon so that the thermal spray ceramic coating film faced downward. For comparison, an alumina crucible lidded with a ceramic member without thermal spray ceramic coating film formed thereon was also set.

Four cycles were conducted, each cycle comprising heating the alumina crucible at a heating rate of 300° C./hr to 1,300° C., keeping it at 1,300° C. for 40 hours and cooling it at a cooling rate of 300° C./hr to room temperature, while a mixed gas of H$_2$ and N$_2$ (H$_2$: 2 vol %) was supplied to the alumina tube, with the keeping time in the fourth cycle being 10 hours. The glass was changed every cycle. After completion of four cycles, the alumina crucible was air-cooled to room temperature and then, the lower side of the ceramic member which had covered the alumina crucible was visually observed, whereupon no peeling occurred on the thermal spray ceramic coating film. Further, on the ceramic member without thermal spray ceramic coating film formed thereon, remarkable discoloration was observed on the surface, whereas on the ceramic member having a thermal spray ceramic coating film formed thereon, discoloration was slight on the surface of the ceramic member, that is, on the surface of the thermal spray ceramic coating film.

In the exposure test to the alkali-containing glass, a plurality of alumina crucibles lidded with the ceramic member were set in the alumina tube. After completion of four cycles, each ceramic member was cut in the vicinity of its center in the thickness direction, and the cross section was analyzed by energy dispersive X-ray spectroscopy (EDX) to observe distribution of Na in the cross sectional direction of the ceramic member.

As a result, in the case of the ceramic member without thermal spray ceramic coating film formed thereon, Na widely spread from the lower surface side which had covered the alumina crucible toward the thickness direction, and penetration of Na$_2$O volatilized from the alkali-containing glass was observed, whereas in the case of the ceramic member having a thermal spray ceramic coating film formed thereon, substantially no distribution of Na was confirmed. It was confirmed from these results that the thermal spray ceramic coating film of the present invention is excellent in prevention of corrosion of the ceramic member by an alkali vapor.

Further, the ceramic member taken out after completion of the first cycle, after completion of the second cycle and after completion of the third cycle was weighed, and the weight change ratio between before and after the exposure test (the ratio of the weight increase or decrease by exposure to the weight before the test) was obtained. The results are shown in the following Table and FIG. 4. The exposure time in Table 2 and FIG. 4 represents the time over which the alumina crucible was kept at 1,300° C. in the exposure test.

TABLE 2

| Exposure time (hr) | | 0 | 40 | 80 | 130 |
|---|---|---|---|---|---|
| Weight change ratio (%) | With coating film | 0 | −0.01 | −0.015 | −0.015 |
| | Without coating film | 0 | 0.08 | 0.15 | 0.22 |

Figure 4:
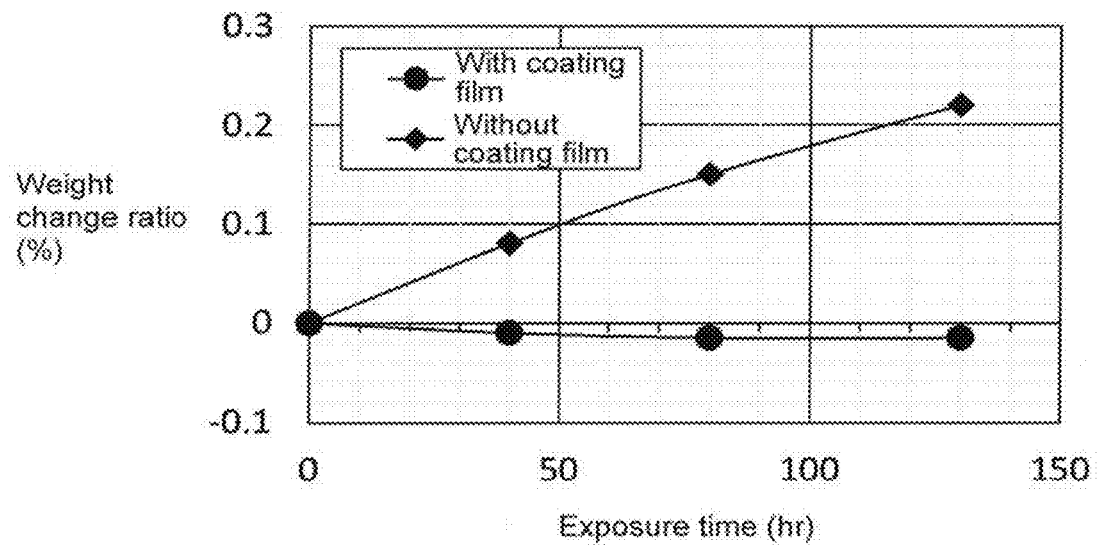
FIG. 4 is a graph illustrating the relation between the exposure time and the weight change ratio in an alkali-containing glass exposure test.

As shown in Table 2 and FIG. 4, a weight increase of the ceramic member without thermal spray ceramic coating film formed thereon was confirmed as the exposure time increased. This is considered to be because Na$_2$O (and K$_2$O) volatilized from the alkali-containing glass reacted with SiO$_2$ constituting the sillimanite brick to form a composite oxide. On the other hand, substantially no weight change of the ceramic member having a thermal spray ceramic coating film formed thereon was confirmed, and it was confirmed that the thermal spray ceramic coating film of the present invention prevented corrosion of the ceramic member by an alkali vapor. The thermal spray ceramic coating film of the present invention being capable of preventing corrosion of the ceramic member by an alkali vapor results also from high gas barrier property of the thermal spray ceramic coating film.

Example 2

A thermal spray ceramic coating film was formed on a metal member as follows.

As the metal member, stainless steel (SUS304) and pure Mo were used. On a region (50 mm×100 mm) on one side surface of the metal member, a thermal spray ceramic coating film having an average thickness of 250 μm was formed by using a feedstock for thermal spray coating having $12CaO.7Al_2O_3$ in an amount such that $CaO.Al_2O_3$ (weight ratio) would be 0.25 blended with white alumina by plasma thermal spray coating under the following conditions.

Plasma Thermal Spray Coating Conditions:

The metal member was preliminarily heated to 200° C., argon and hydrogen gas were used as the plasma gas, and the thermal spray coating distance and the nozzle moving rate were 90 mm/sec and 300 mm/sec, respectively.

Figure 5:
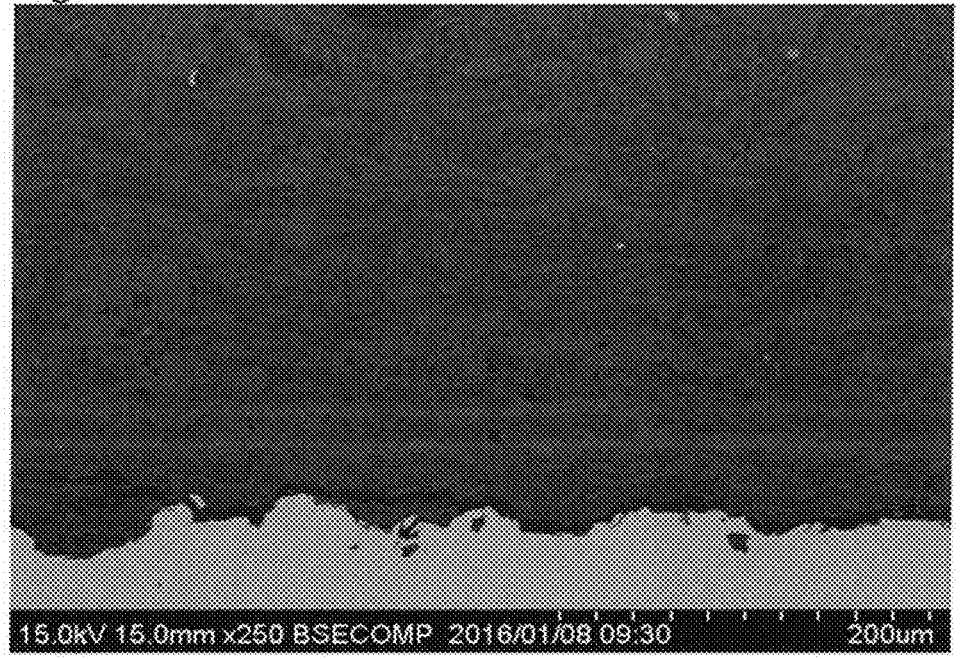
FIG. 5 is a micrograph of a cross section of a thermal spray ceramic coating film formed on a metal member (stainless steel plate).
Figure 6:
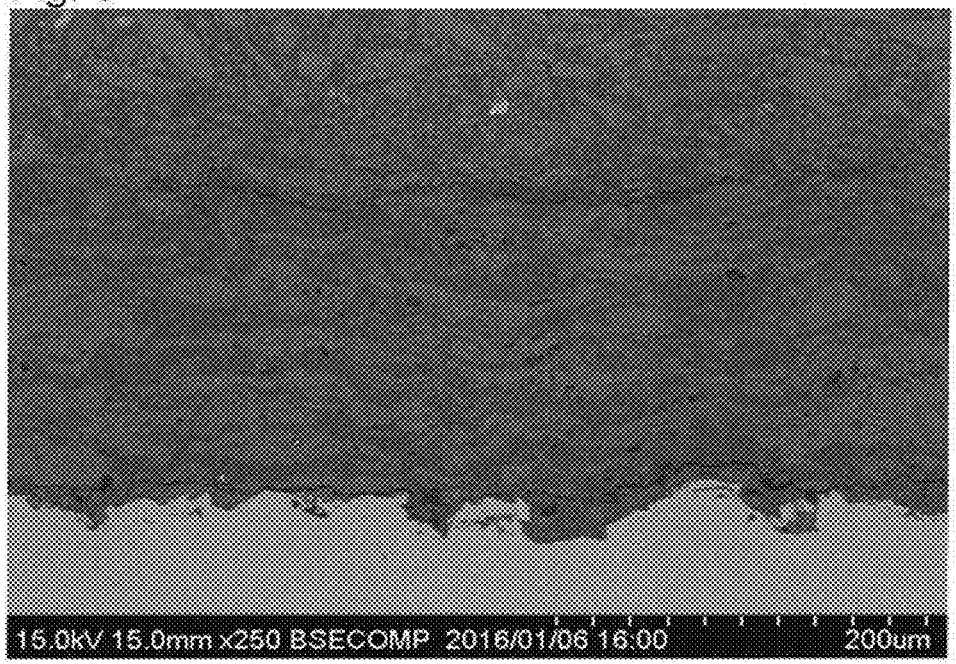
FIG. 6 is a micrograph of a cross section of a thermal spray ceramic coating film formed on a metal member (Mo plate).

An image of the cross section of the thermal spray ceramic coating film formed on the metal member was taken by a scanning electron microscope (SEM). FIG. 5 is an image of the cross section of the thermal spray ceramic coating film formed on the metal member (SUS304). FIG. 6 is an image of the cross section of the thermal spray ceramic coating film formed on the metal member (Mo). In FIGS. 5 and 6, the lower white portion corresponds to the metal member.

It is observed from FIGS. 5 and 6 that the formed thermal spray ceramic coating film had relatively few pores, and the adhesion at the interface was favorable. Further, in the same manner as the thermal spray ceramic coating film formed on the ceramic member, $12CaO.7Al_2O_3$ and white alumina formed a lamellar structure in the thermal spray ceramic coating film.

Then, physical properties (Vickers hardness Hv, porosity in the coating film cross section) of the thermal spray ceramic coating film of the present invention and conventional thermal spray ceramic coating films (alumina coating film, zirconia coating film) were compared.

As the metal member, stainless steel (SUS304, 50 mm×100 mm×8 mm) was used. On a surface region (50 mm×100 mm) of the stainless steel, a foundation alloy coat having a thickness of 80 μm was formed by atmospheric plasma spraying, and then a thermal spray ceramic coating film (average thickness: 250 μm) having each of the following five compositions was formed by atmospheric plasma spraying. In a case where the thermal spray ceramic coating film was an alumina coating film, the composition of the foundation alloy coat was NiCrAlY. On the other hand, in a case where the thermal spray ceramic coating film is a zirconia coating film, the composition of the foundation alloy coat was $Cr_2O_3$—NiCr.

Composition of Thermal Spray Ceramic Coating Film:

$Al_2O_3$ (purity: 99.9%)
$Al_2O_3$-3% $TiO_2$
8% $Y_2O_3$—$ZrO_2$ (1)
8% $Y_2O_3$—$ZrO_2$ (2) (high density)
$Al_2O_3$-20% CaO Among them, with respect to $Al_2O_3$-20% CaO, the composition of the feedstock for thermal spray coating having $12CaO.7Al_2O_3$ in an amount such that the weight ratio ($CaO/Al_2O_3$) would be 0.25 blended with white alumina, used for the above-described thermal spray ceramic coating film formed on the ceramic member, is represented in the same manner as the compositions of the other thermal spray ceramic coating films. The other thermal spray ceramic coating films were alumina coating films and zirconia coating films which have been widely used. For formation of such thermal spray ceramic coating films, atmospheric plasma spraying was operated under the following conditions.

Plasma Thermal Spray Coating Conditions:

Each thermal spray ceramic coating film was formed on a metal member preliminarily preheated to 200° C. by using argon and hydrogen gas as the plasma gas at a thermal spray coating distance and a nozzle moving rate of respectively 200 mm/sec.

Of the formed thermal spray ceramic coating films, the Vickers hardness Hv was measured in the same manner as above. Further, an image of the cross section of the formed thermal spray ceramic coating films was taken by a scanning electron microscope (SEM), and the obtained image of the cross section was subjected to binary processing by means of image processing to determine the porosity (%) of the coating film cross section. The results are shown in Table 3 and FIG. 7.

TABLE 3

|  | Vickers hardness Hv (kg/mm$^2$) | Porosity (%) |
|---|---|---|
| $Al_2O_3$ | 950 | 3.8 |
| $Al_2O_3$—3% $TiO_2$ | 738 | 5.5 |
| 8% $Y_2O_3$—$ZrO_2$ (1) | 480 | 9.2 |
| 8% $Y_2O_3$—$ZrO_2$ (2) | 750 | 4.2 |
| $Al_2O_3$—20% CaO | 785 | 1.9 |

Figure 7:
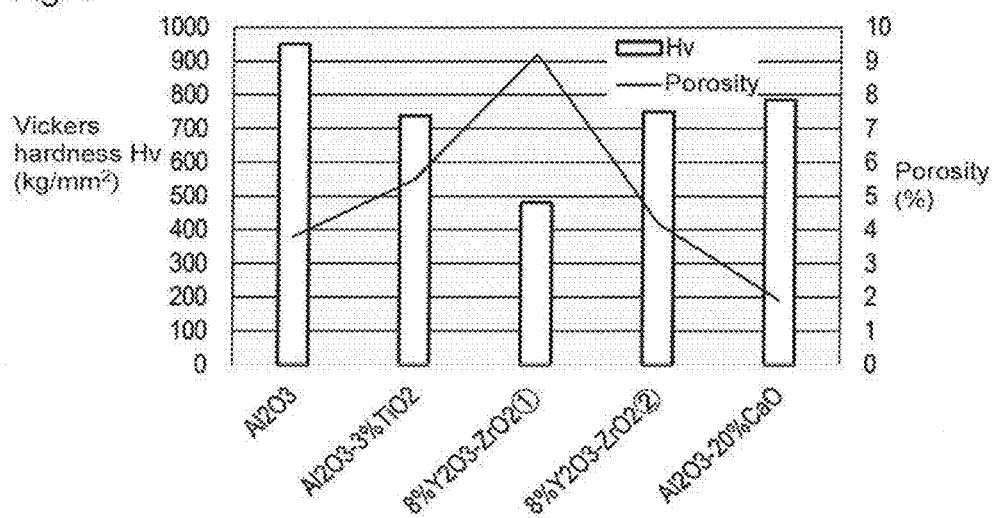
FIG. 7 is a graph illustrating the Vickers hardness Hv and the porosity in a cross section of various thermal spray ceramic coating films having different compositions.

As shown in Table 3 and FIG. 7, of the thermal spray ceramic coating film ($Al_2O_3$-20% CaO) of the present invention, the Vickers hardness Hv was high as compared with a zirconia coating film and was at the same level as that of a conventional alumina coating film. The porosity in the coating film cross section was low as compared with conventional alumina coating film and zirconia coating film.

Among the above thermal spray ceramic coating films, ones having compositions of $Al_2O_3$-3% $TiO_2$, 8% $Y_2O_3$—$ZrO_2$ (2) and $Al_2O_3$-20% CaO were subjected to an abrasive wear test by using an abrasive wear test apparatus manufactured by Suga Test Instruments Co., Ltd. in accordance with the apparatus described in JIS H8304 (2014), Appendix B, to evaluate wear property. Conditions of the abrasive wear test were as follows. Two test pieces were prepared from each thermal spray ceramic coating film, and the abrasive wear test was conducted on the two test pieces. The results of the abrasive wear test are shown in Table 4.

Conditions of Abrasive Wear Test

Load: 25N, abrasive paper No.: #240 (abrasive grains: SiC), number of abrasion: 400×2

TABLE 4

| Coating film | Foundation coat | Wear depth (μm) |
|---|---|---|
| $Al_2O_3$—3% $TiO_2$ | CoNiCAiY | 42.36 |
| $Al_2O_3$—20% CaO | CoNiCAiY | 20.22 |
| 8% $Y_2O_3$—$ZrO_2$ (2) | $Cr_3C_2$—NiCr | 34.36 |

As shown in Table 4, it was confirmed that the thermal spray ceramic coating film ($Al_2O_3$-20% CaO) of the present invention was excellent in wear resistance with a small amount of wear as compared with conventional alumina coating film ($Al_2O_3$-3% $TiO_2$) and zirconia coating film (8% $Y_2O_3$—$ZrO_2$ (2)).

Figure 8:
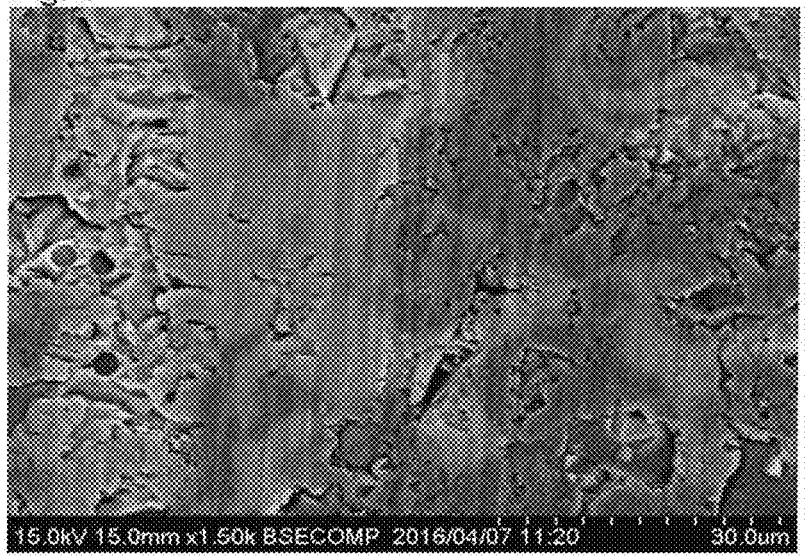
FIG. 8 is a micrograph of an abraded surface of a thermal spray ceramic coating film of the present invention after subjected to an abrasive wear test.
Figure 9:
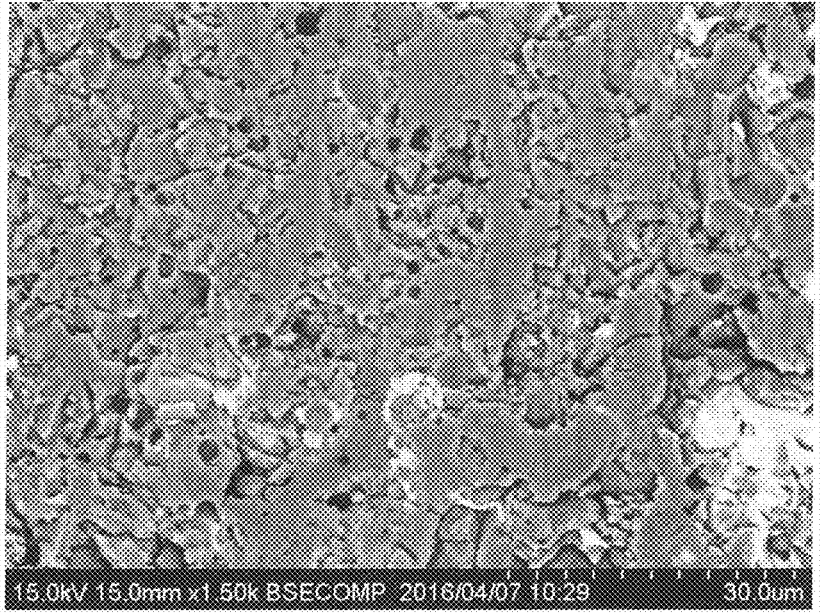
FIG. 9 is a micrograph of an abraded surface of a conventional alumina coating film ($Al_2O_3$-3% $TiO_2$) after subjected to an abrasive wear test.
Figure 10:
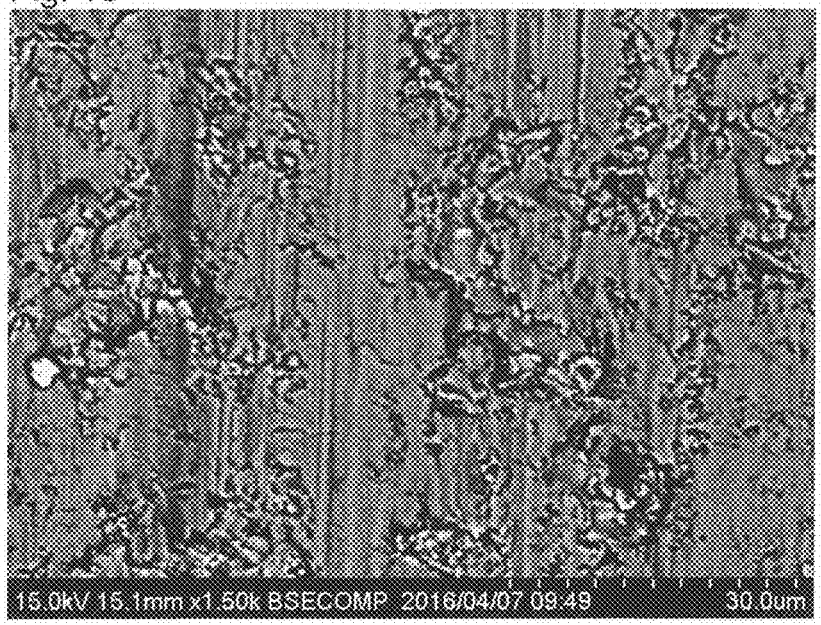
FIG. 10 is a micrograph of an abraded surface of a conventional zirconia coating film (8% $Y_2O_3$—$ZrO_2$) after subjected to an abrasive wear test.

The abraded surface of the thermal spray ceramic coating film after the abrasive wear test was photographed by a scanning electron microscope (SEM). FIG. 8 is an image (1,200 magnifications) of the wear surface of the thermal spray ceramic coating film ($Al_2O_3$-20% CaO) of the present invention after the abrasive wear test. FIG. 9 is an image (1,200 magnifications) of the abraded surface of the conventional alumina coating film ($Al_2O_3$-3% $TiO_2$) after the abrasive wear test. FIG. 10 is an image (1,200 magnifications) of the abraded surface of the conventional zirconia coating film (8% $Y_2O_3$—$ZrO_2$) after the abrasive wear test.

As evident from the comparison between FIGS. 8, 9 and 10, in the thermal spray ceramic coating film ($Al_2O_3$-20% CaO) of the present invention, the interface between the $12CaO.7Al_2O_3$ phase and $Al_2O_3$ was unclear, and they were bonded very well. Further, cracks generated in the particles in each phase, and did not substantially occurred at the interface.

Based on the above results, it was found that when the thermal spray ceramic coating film had a weight ratio ($CaO/Al_2O_3$) of more than 0.11 to 0.50, such a thermal spray ceramic coating film meet the above plurality of properties and is effective.

This application is a continuation of PCT Application No. PCT/JP2017/021021, filed on Jun. 6, 2017, which is based upon and claims the benefit of priority from Japanese Patent Application No. 2016-120896 filed on Jun. 17, 2016. The contents of those applications are incorporated herein by reference in their entireties.

What is claimed is:

1. A ceramic coating film-provided member, comprising:
    a ceramic member or a metal member; and
    a thermal spray ceramic coating film formed on at least a part of the surface of the ceramic member or the metal member;
    wherein the thermal spray ceramic coating film contains white alumina ($Al_2O_3$) and $12CaO.7Al_2O_3$, and the weight ratio of CaO to $Al_2O_3$ ($CaO/Al_2O_3$) is from more than 0.11 to 0.50.

2. The ceramic coating film-provided member according to claim 1, wherein the weight ratio of CaO to $Al_2O_3$ ($CaO/Al_2O_3$) is from 0.15 to 0.40.

3. The ceramic coating film-provided member according to claim 1, wherein the weight ratio of CaO to $Al_2O_3$ ($CaO/Al_2O_3$) is from 0.20 to 0.40.

4. The ceramic coating film-provided member according to claim 1, wherein the weight ratio of CaO to $Al_2O_3$ ($CaO/Al_2O_3$) is from 0.25 to 0.35.

5. The ceramic coating film-provided member according to claim 1, wherein the thermal spray ceramic coating film is a plasma spray coating film.

6. The ceramic coating film-provided member according to claim 1, wherein the thermal spray ceramic coating film is a high velocity oxy-fuel spray coating film.

7. The ceramic coating film-provided member according to claim 1, wherein the thermal spray ceramic coating film has an average thickness of at least 80 μm.

8. The ceramic coating film-provided member according to claim 1, wherein the ceramic member is present and the ceramic member comprises sintered brick composed mainly of alumina and silica.

9. The ceramic coating film-provided member according to claim 1, wherein the metal member is present and the metal member comprises a steel material or a Mo material.

10. A glass article manufacturing apparatus comprising the ceramic coating film-provided member according to claim 1.

11. The glass article manufacturing apparatus according to claim 10, wherein the ceramic coating film-provided member is a portion of the glass article manufacturing apparatus not to be in direct contact with molten glass but to be influenced by volatile components or a corrosive gas formed from the molten glass.

12. The glass article manufacturing apparatus according to claim 10, comprising a molten glass which contains a sodium and/or potassium alkali metal component.

13. The glass article manufacturing apparatus according to claim 10,
    wherein the ceramic member is present and the ceramic member comprises sintered brick composed mainly of alumina and silica.

14. The glass article manufacturing apparatus according to claim 10, wherein the metal member is present and the metal member comprises a steel material or a Mo material.

* * * * *